Nov. 28, 1961  S. W. ALDERSON  3,010,223
HUMAN EQUIVALENT DUMMY

Filed Sept. 2, 1959  5 Sheets-Sheet 1

INVENTOR.
SAMUEL W. ALDERSON
BY John P. Chandler
HIS ATTORNEY.

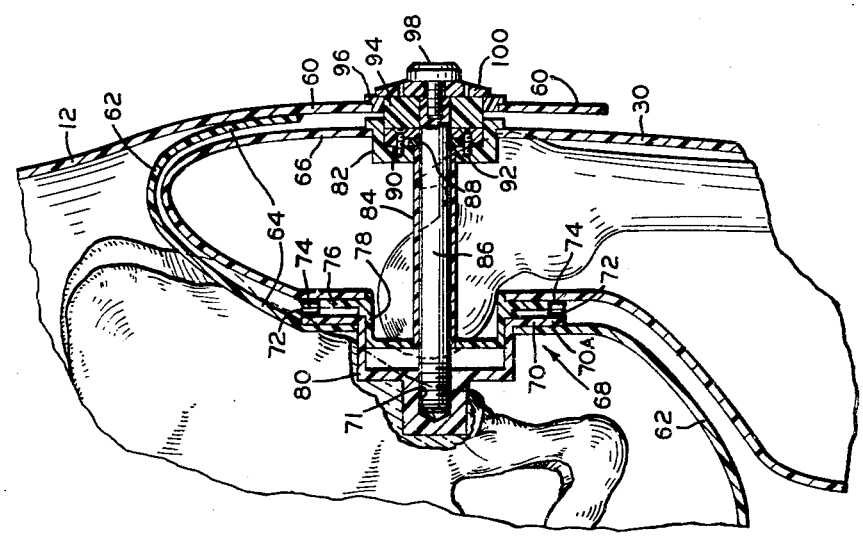

INVENTOR.
SAMUEL W. ALDERSON
BY John P. Chandler
HIS ATTORNEY.

Nov. 28, 1961 S. W. ALDERSON 3,010,223
HUMAN EQUIVALENT DUMMY
Filed Sept. 2, 1959 5 Sheets-Sheet 4

INVENTOR.
SAMUEL W. ALDERSON
BY John P. Chandler
HIS ATTORNEY.

Nov. 28, 1961 — S. W. ALDERSON — 3,010,223
HUMAN EQUIVALENT DUMMY
Filed Sept. 2, 1959 — 5 Sheets-Sheet 5
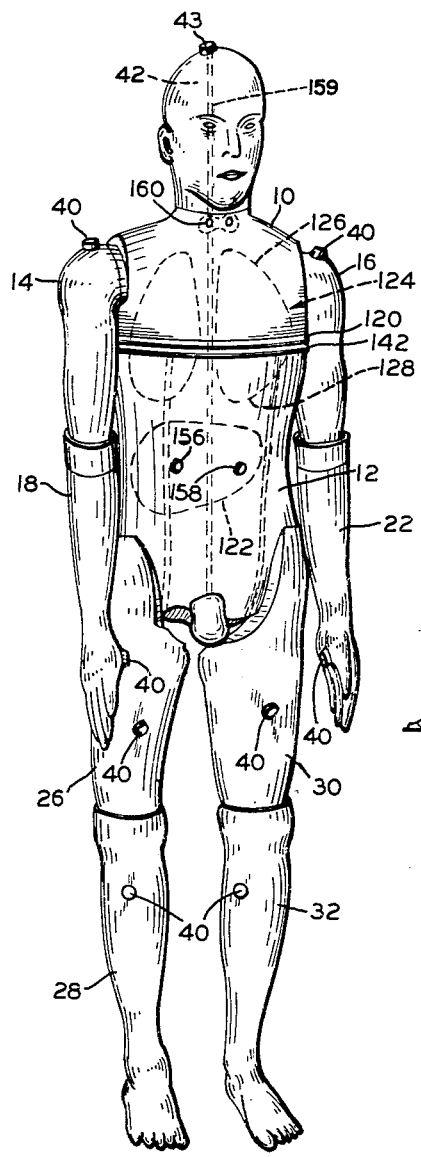
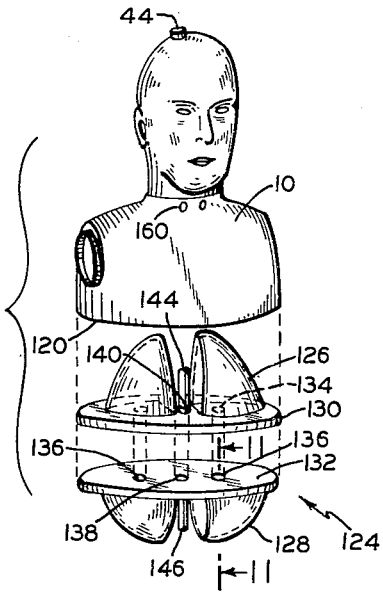
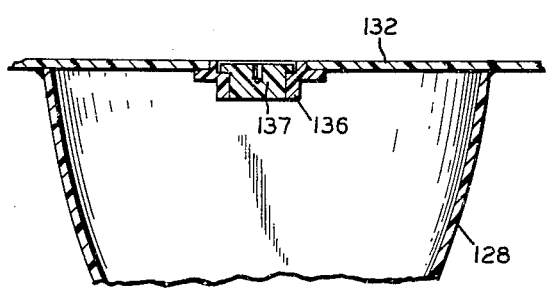
INVENTOR.
SAMUEL W. ALDERSON

United States Patent Office 3,010,223
Patented Nov. 28, 1961

3,010,223
HUMAN EQUIVALENT DUMMY
Samuel W. Alderson, New York, N.Y., assignor to Alderson Research Laboratories, Inc., Long Island City, N.Y., a corporation of New York
Filed Sept. 2, 1959, Ser. No. 837,742
11 Claims. (Cl. 35—17)

This invention relates to plastic dummies or manikins for use in connection with various studies of the effects of radiation upon human beings. More particularly it relates to manikins which interact with radiation as do human beings but which can be irradiated at will and the body of which can be probed at will to determine the radiation dosages absorbed within the body.

In the past, the studies of radiation effects upon human beings have been hampered by the fact that it was inadvisable to expose human beings to radiation needlessly or frequently, and such studies have also been hampered by the fact that the interior of a human body was not generally accessible for measurement of dosage. A number of crude devices have been constructed in the past to accomplish a few of the objects of this invention, but for the most part, no devices have been available to accomplish most of these objects and to accomplish them with sufficient accuracy.

The manikins of the present invention are generally made from plastic materials which can absorb or emit radiation in a manner closely related to the manner in which the human body absorbs and emits radiation. This invention consists of an articulated plastic manikin which is equivalent in dimensions and contours to a man of average size. This manikin is formed from sheet plastic material which is virtually transparent to radiation, and such sheet is formed into a number of separate hollow body segments. Means are provided for filling the several segments with solutions which are equivalent to human soft tissue in their interaction with radiation.

In one of its forms the manikin contains a human skeleton suspended non-metallically within the shell so that when the segments are filled with the tissue-equivalent solution, radiation from the outside penetrates into and is absorbed by the bones as in a manner similar to that of a live human.

In another of its forms, any desired combination of internal organs are placed within the manikin, either with or without a skeleton. Such organs are also formed of a plastic sheet which is transparent to radiation. Means are provided to fill the organs with solution which may be radioactive. When so filled, and when the remainder of the body is filled with the tissue-equivalent solution, the manikin will emit radiation to the outside as a consequence of having a radioactive burden in its organs, just as would a living man so burdened.

In another form, hollow plastic tubes are installed within the manikin, either in conjunction with the skeleton and/or organs or separately. Means are provided for permitting the insertion of dosimeters into these tubes in order that the dosage absorbed in body regions traversed by these tubes can be measured. When a skeleton is installed in the manikins, means are also provided for inserting dosimeters inside the long bones of the body or inside of the spinal column.

An important object of the invention is to provide a radiation-equivalent manikin of the type described immediately above, equipped with a skeleton and means for inserting dosimeters in various parts of the body, including the skeleton, in order that the radiation which would have been absorbed by a living man in a given situation may be measured within the radiation-equivalent manikin.

Another object of this invention is to provide a radiation-equivalent manikin of this character which may be irradiated with neutrons as would be a living man and which will produce neutron-induced secondary radiation which may be measured in a whole-body counter, thus providing a basis for determining experimentally the neutron radiation to which a living man has been subjected.

A further object of the invention is to provide a radiation-equivalent manikin which can be placed at the site of an accident where a living man has been exposed to large doses of radiation so that dosage absorbed by the living man may be measured with dosimeters within the manikin.

Another object of this invention is to provide a manikin of such character that experimental investigations may be made directly of the effectiveness of protective personal gear or of shielding systems in preventing the absorption of radiation by the persons wearing protective gear or located in the vicinity of the shielding.

Another object of this invention is to provide a manikin as described above in order that radiation absorbed by workers in atomic power plants and other nuclear facilities may be measured to provide a calibration between such absorbed dosages and future medical histories of such workers.

Another object of this invention is to provide an articulated anthropomorphic radiation-equivalent manikin containing organs which may be filled separately with solutions of radioactive materials in order that the manikin can emit radiation similarly to the radiation emitted by a living man with an equivalent radioactive burden in his internal organs.

Another object of this invention is to provide a radiation-equivalent manikin of the type described in order that radiation emission patterns can be established in an iron-room whole-body counter for comparison with the radiation emission patterns of living men in order that the nature, amount, and distribution of the radioactive burden in the living men may be determined.

A further object of the invention is to provide the radiation-equivalent manikin of such type as to permit studies of the emission patterns of a radioactive tracer or tracers to be facilitated by producing distribution patterns of radiation identical to those found by tests on living men.

Another object of this invention is to provide a radiation-equivalent manikin as described immediately above which will serve as a calibration in a liquid whole-body counter of the total radiation found to be emitted by living men.

For a better understanding of the present invention together with other and further objects thereof, reference is made to the following description taken in connection with the accompanying drawings wherein, FIG. 1 is a front elevational view of the human-equivalent dummy having a skeleton suspended within.

FIG. 4 is a side elevational view of the hip section.

FIG. 5 is a sectional view taken along line 5—5 of FIG. 4.

FIG. 9 is a front elevational view of the human-equivalent dummy modified by the insertion of organs and without the skeleton.

FIG. 10 is an exploded view showing the upper torso and lung construction.

FIG. 11 is a sectional view taken along line 11—11 of FIG. 10.

Figure 1:
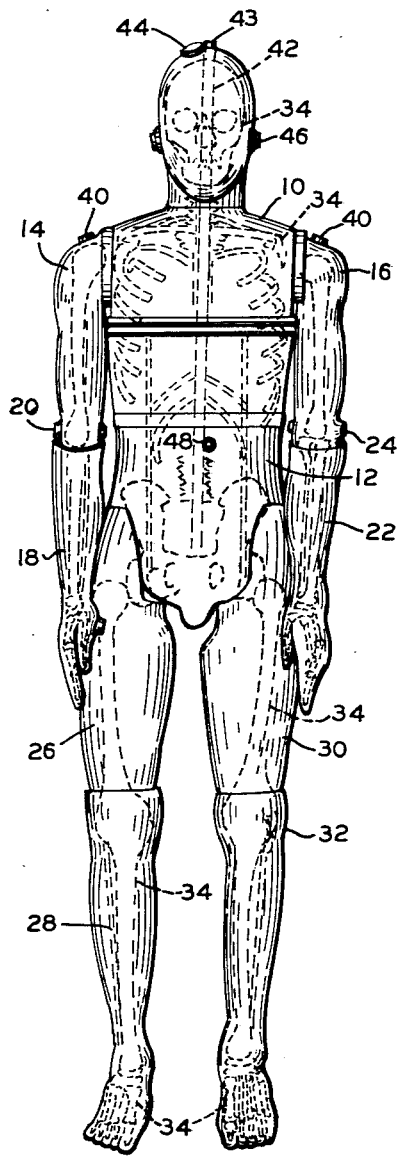
Figure 2:
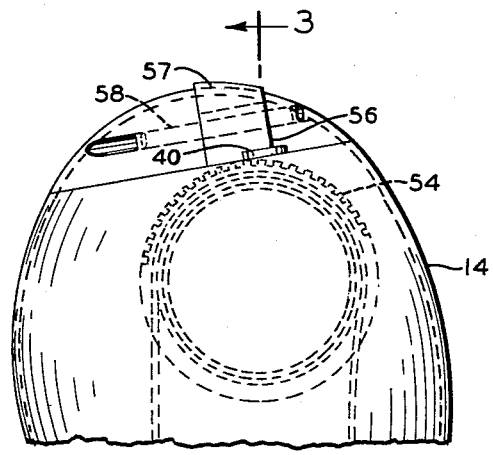
FIG. 2 is the side elevation of the shoulder showing the method of attachment of the torso.
Figure 3:
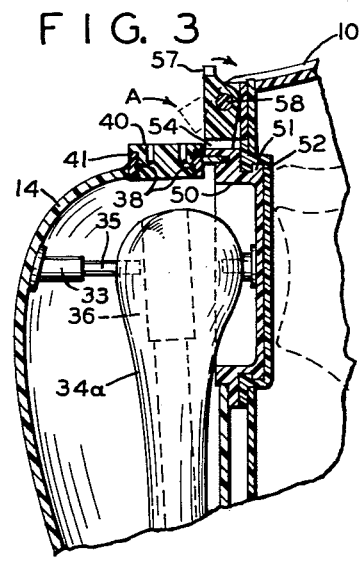
FIG. 3 is a sectional view taken along line 3—3 of FIG. 2.

Referring now to FIG. 1 reference numeral 10 represents the head and upper torso. The lower torso 12 is attached below the upper torso. Right upper arm 14 and left upper arm 16 are movably attached to the upper torso 10. A composite forearm and right hand 18 is pivotally attached at 20 to the right upper arm 14 and a composite forearm and left hand 22 is pivotally attached at 24 to the upper left arm 16. An upper right leg 26 is pivotally attached to the lower torso and a composite lower leg and right foot 28 is pivotally attached to the upper right leg 26. An upper left leg 30 is also pivotally attached to the lower torso and a composite lower leg and left foot 32 is pivotally attached to the upper left leg 30. All the above mentioned appendages are formed from plastic material of any suitable composition such as cellulose acetate butyrate. A natural skeleton or equivalent 34 is suspended within the segmented body by supporting members of the same plastic material. There are various ways in which this can be done, such as by providing plastic sockets 33 cemented to the arm shell and which receives plastic pivot pins 35 secured in openings in the bone 34a as shown in FIG. 3. Holes are drilled in various bones such as hole 36 in the upper arm bone 34a, for the purpose of insertion of dosimeters during the process of making tests etc. Each point of insertion of a dosimeter into the skeleton is made accessible from the outside of the body by means of a port such as shown at 38, FIG. 3, which is equipped with a closure 40 made watertight by a gasket 41. This port, in addition to serving as a point of entry for the dosimeter also may be used as a filling opening for fluids introduced into the shell to simulate soft tissues in their interaction with radiation. In order to provide for tests in the various soft tissue portions of the body dosimeter tubes are used, such as tube 42, FIG. 1, extending from the crotch to the top of the head and which is closed by screw cap 43. Another screw cap 44 can be removed to fill the head and upper torso with fluid. Other such tubes may extend through the head to the ears at 46 and from anterior to posterior end at port 48 in the lower torso.

There are many fluid mixtures which would be suitable for the foregoing purpose of simulating soft tissues in their interaction with radiation. One such solution which has given satisfactory results is composed of the following constituents:

| | Percent by weight |
|---|---|
| Metaphos or other sequestering agent | 1.062 |
| $FeCl_3 \cdot 6H_2O$ | .0237 |
| A fungicide to inhibit fungus growth | .253 |
| $MgSO_4$ | .20 |
| $KHSO_4$ | .726 |
| Urea | 6.8 |
| HCl (concentrated) | 3.4 |
| Distilled $H_2O$ | 46.0 |
| Ethylene glycol | 45.2 |

Due to the large torques developed by the extended appendages, the pivot member is made as large as possible. This will be noted by referring to FIGS. 2, 3, 4, and 5. Shoulder pivot member 50 is round and has flange 51 which is rotatably mounted in bearing 52. Pivot member 50 is cemented to the arm 14 which it amply supports due to its large diameter. The bearing member 52 is cemented or otherwise affixed to the shoulder portion of the upper torso 10. The member 50 furthermore is constructed with a toothed segment 54 which cooperates with a toothed block 56 to lock the arm in any position within the arc of the toothed segment. In order to change position of the arm a lip 57 is pressed to rotate the toothed block 56 about a pin 58 into dotted position A, FIG. 3. While the block 56 is in this position it is apparent that the arm 14 and toothed segment 54 may be rotated freely in the shoulder bearing 52.

One of the pelvic joint assemblies is illustrated by FIGS. 4 and 5 wherein the lower torso 12 projects downwardly to form a pelvic shell 60. Beneath this shell a suitably shaped wall 62 is cemented thereto to form the pelvic socket 64 which receives the top end 66 of the upper leg 30. The wall 62 extends downwardly and then horizontally to form the lower portion of the lower torso. At the vertical portion generally indicated at 68 of this wall 62 there is attached an inner pelvic bearing 70 having a threaded portion 71. An annular toothed ring 72 is secured to the flange 70A of bearing 70, and cooperates with a mating toothed ring 74 which is secured to the upper leg shell 66. An inner pelvic bearing 76 is also secured to the upper leg shell 66. The cylindrical projection 78 of pivot 76 is journaled in a cylindrical portion 80 of the inner pelvic bearing 70. An outer leg bearing 82 is secured in the wall 66 of the upper leg shell. A tube 84 is affixed at one end to the inner pelvic pivot 76 and extends transversely through the upper leg shell 66, where the free end is cemented to the outer leg bearing 82 thus providing a sleeve through which a pelvic tie rod 86 extends. A flange 88 is secured to the tie rod 86 and a retaining ring 90 encircles the flange to hold the tie rod in position by virtue of screws 92 inserted into the outer leg bearing 82. A disc 94 serves as the outer pelvic pivot and is journalled in an outer pelvic bearing 96 which is fastened to the pelvic shell 60. The tie rod 86 is threaded at one end for mounting in the threaded portion 71 of the inner pelvic bearing 70 while the opposite end is tapped to receive a screw 98 which clamps against a retainer 100 to secure the complete assembly in position.

Figure 6:
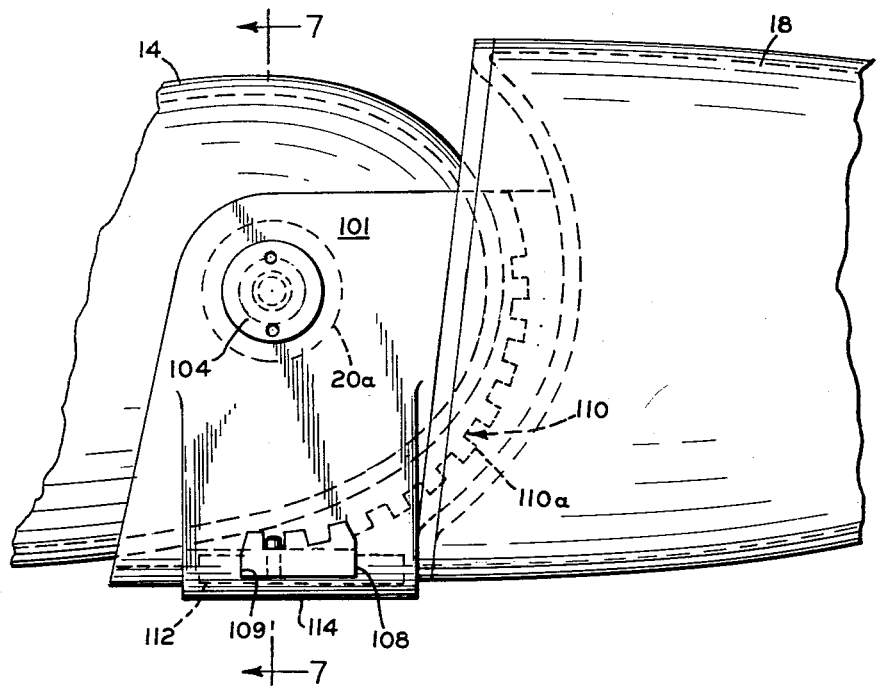
FIG. 6 is an elevational view of the elbow section.
Figure 7:
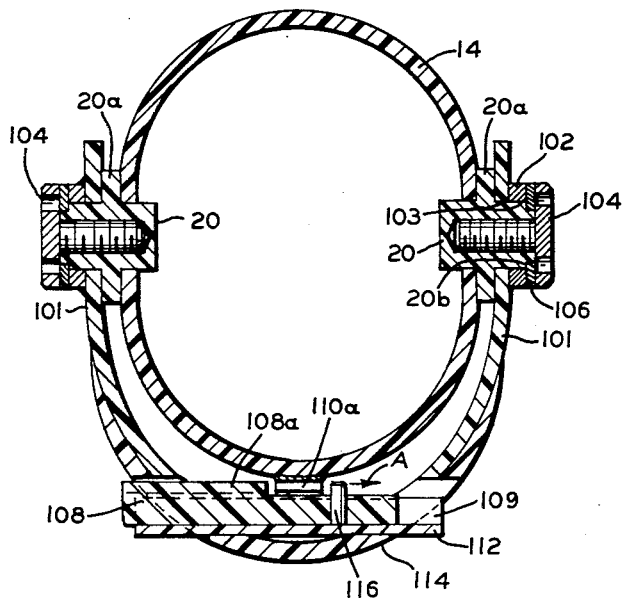
FIG. 7 is a sectional view taken along line 7—7 of FIG. 6.

The usual design practice, in the case of elbows and knees, would be to provide a shell joint more or less concentric with the skeletal joint. This would require the removal of appreciable sections of bone to permit rotation of the shell segments about the common axis. To avoid this the axis of rotation of the shell has been displaced upwardly so that separating surfaces between the adjacent shell segments pass between the adjacent articulating bones. By referring to FIGS. 6 and 7 it will be noted that the same basic principle of using toothed sectors for locking the member in position is employed in the elbow as was disclosed above in the case of the shoulder and pelvis. The upper arm 14 rotatably supports the composite forearm and hand 18 upon two pivots 20 which are cemented in opposite sides of the shell 14 as best shown in FIG. 7. It will be observed that the pivot member 20 is constructed substantially cylindrical with an annular flange 20a protruding from the central portion thereof. This flange serves two purposes. First to provide adequate area for cementing the parts together in order to withstand the large stresses to which they may be subjected. Secondly, the flange provides a large thrust bearing surface to absorb axially directed forces. A forearm cuff 101 is attached to and protrudes from the forearm shell 18 for the purpose of providing bearings in which to journal the pivot members 20. A disc 102 is cemented to each of the opposed sides of the cuff 101 and a hole drilled through to provide an increased radial bearing surface 103 therein to receive the pivot member 20. A screw 104 is inserted into a tapped hole in the pivot 20 and clamps a retaining washer 106 against a shoulder 20b of the pivot 20. The shoulder is of the proper axial dimension to permit the bearing formed from parts 101 and 102 to rotate freely between the retaining washer 106 and the flange 20a.

The forearm appendage 18 is restrained from rotation by virtue of the coaction of a toothed locking bar 108 with a toothed sector 110. The sector 110 is secured to the shell 14 in a radial position with respect to the pivots 20. The locking bar 108 is slidably received in a slot 109 in a guide 112 for movement in the direction of the arrow A into locked position. Guide 112 is cemented in position in a retainer 114 which in turn is secured to the cuff 101.

It will now become apparent that the forearm 18 may be displaced radially about the pivot 20 when the toothed locking bar 108 is in disengagement with the teeth 110a of the sector 110 as shown. The sector 110 is of sufficient circumferential length to enable the forearm 18 to assume any position up to 90° upper arm 14, minimum movement limited, of course, by the spacing between teeth of the sector 110. Any position of the forearm 18 may be retained by moving the locking bar 108 in the direction of the arrow A so that the teeth 108a of the locking bar engage the teeth 110a of the sector 110 to lock the forearm 18 against rotation.

Figure 8:
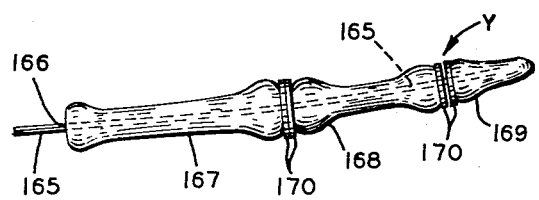
FIG. 8 is a view of a portion of a natural skeleton or the like showing means of articulation.

The fixation of various bones of the skeletal structure to permit them to be proportioned naturally within the space afforded by the shells is accomplished by threading a plastic rod 165, FIG. 8, through holes 166 (either natural or drilled) in adjacent members such as finger members 167, 168 and 169. Two spacers 170 are placed between each adjacent pair of bones so that when placed in the shell the individual bones can be spaced as desired and the spacers cemented in place to maintain the spacing permanently as indicated at Y. This construction is employed on all of the skeletal structures such as the vertical column, toes, etc.

Referring now to FIGS. 9, 10, 11 and 12 which represent a human-equivalent dummy similar to the above described dummy but without the enclosure of a skeleton. In the following description of FIG. 9 and associated figures, the same reference numerals will be used to identify like appendages as were used for FIG. 1 since the dummies are substantially the same. If it is so desired the dummy can be used without any enclosures other than the structural components. However there are instances and applications where it is desirable to include some of the soft tissue organs such as kidneys, lungs etc. It may also be desirable to form the dummy either completely or partially from an optically transparent material such as cellulose acetate butyrate, but it is understood that the present invention is not limited to any specific material.

The enclosure of organs such as the liver 122 within the dummy is accomplished by constructing the organ of the same or similar material as the main appendages if desired and then suspending it in its proper relative position within the section of the dummy where it naturally occurs. The organ is suspended in several ways depending upon its location. If, for example, the organ is adjacent a wall it can be cemented directly to the wall. If, however, it is away from any structural part it is suspended by plastic tubing or lacing which is secured to the nearest convenient structural member.

The construction and enclosure of the lungs 124, however, is accomplished in a different manner, for various reasons. They are in the form of an upper section 126 and a lower section 128. The upper two sections 126 are mounted upon a substantially elliptical plate 130 and the lower two sections 128 are secured below a second similar plate 132 in proper position so that when the two plates are brought together and secured the sections will occupy the same space and give the appearance of a natural set of lungs. This is best illustrated by FIG. 10.

Figure 12:
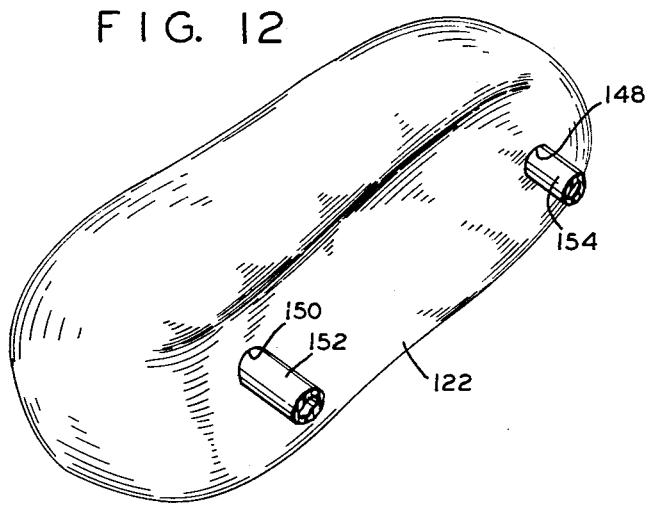
FIG. 12 is a perspective view of an organ.

As will become apparent, in essence, the lung construction actually comprises four separate hollow units which are liquid-tight so that it would be possible to contain a liquid therein, if such was desired. Each of these hollow units may have suitable ports for filling and discharging liquid from the dummy. Port holes 134 are supplied in plate 130 and holes 136 in plate 132 for this purpose. It will be noted by reference to FIGS. 9 and 10 that plates 130 and 132 are cemented to shells 10 and 12 to close the shells and make them water-tight. In as much as the plates 132 and 130 divide the torso into two sections there are provided ports 138 and 140 in plates 132 and 130, respectively, which are aligned when the plates are in assembled position. There is a tube 144 fastened to port 140 and a tube 146 fastened to port 138 through which liquids may be passed from one section of the torso to the other, or they may be used for any other purpose required. The liver 122 FIGS. 9 and 12 is preferably formed to resemble a natural organ as near as possible as are any of the other organs which it may be desirable or required to use. It may be suitably mounted within the manikin by tie rods cemented in place. Port openings 148 and 150 are formed in the liver 122. Tubes 152 and 154 are connected to ports 150 and 148 respectively, and are so located as to extend forwardly to terminate at ports in the front of the lower torso 12. Tube 152 terminates at port 156 and tube 154 at port 158. These latter ports are fitted with water-tight caps.

The purpose of having two connecting tubes 152 and 154 to the outside of the dummy is for convenience in filling and emptying the organ, and equally important, for cleaning out any last vestige of material therefrom. For example a hose connection can be made from port 158 to a supply of water and a second hose connection from port 156 to a sink or disposal unit and a continuous stream of water passed through to flush the liver 122. This principle is used throughout the entire dummy and ports are located at various points 40 where it is desirable to insert or remove test materials etc.

In addition to the use of hollow organs, other enclosures can be utilized for test purposes etc. In this respect a tube such as 159 can be designed to extend from a port 160 in the neck (FIG. 9) to the port at the top of the head. Soft tissue equivalent liquids can be introduced into any or all appendages through ports 40 to either partially or completely fill the member as desired.

From the above description it will become obvious that while two modifications have been described (viz, a dummy formed of radiolucent material and with enclosed skeleton and a dummy without skeleton but with organs etc.) many other variations therein are feasable, without departing from the field of the invention which should be limited only by the scope of the appended claims.

What I claim is:

1. A radiolucent hollow shell in the form of a human body and comprising a plurality of fluid tight hollow shells made from radiation transparent plastic material and being so shaped as to form a torso, a head secured to the torso, and upper and lower arm and leg sections joined together and to the torso by a pivotal assembly, said pivoted assembly comprising a toothed segment carried by one member and a movable block carried by an adjoining member to lock the movable member in an adjusted, fixed position.

2. The structure recited in claim 1 and at least a portion of a human skeleton disposed within the shell.

3. The structure recited in claim 1 and a human skeleton portioned within the shell and which has openings therein for the introduction of measuring instruments.

4. The structure recited in claim 1 and a human skeleton therein and which has a system of ports and ducts for the insertion of a dosimeter.

5. The structure recited in claim 1 and a combination of hollow simulated organs contained within the shell and which are provided with means for separately loading the same with solutions of radioactive materials.

6. The structure recited in claim 1 and simulated organs such as the thyroid, liver, stomach, spleen and kidneys contained in the shell and means for introducing solutions of radioactive materials into the organs.

7. A radiolucent hollow shell, which is equivalent to the average human in size and contour for radiological test purposes for both absorption and emission and which can be probed at a plurality of points for dosage measurements and having a plurality of openings and closures therefor and a solution contained therein which has the same proportions of elements as the soft tissues of the human body.

8. A human equivalent dummy comprising a plurality of fluid tight hollow shells made from radiation transparent plastic material and being so shaped as to form a torso, a head secured to the torso, and upper and lower arm and leg sections joined together and to the torso by a pivotal assembly, said pivoted assembly comprising a toothed segment carried by one member and a toothed block carried by an adjoining member to lock the movable member in an adjusted, fixed position.

9. The structure recited in claim 8 wherein a human skeleton in sections is suspended within the hollow shells corresponding to the several sections of the human body and openings are formed in said sections for the reception of dosimeters, the several shells having openings for the reception of the dosimeters, and closures for the openings.

10. The structure recited in claim 8 wherein a section of a human skeleton is suspended within each hollow shell by plastic mounting means.

11. A human equivalent dummy comprising a plurality of hollow shells of fluid-tight construction and made from transparent plastic material to provide a torso formed in upper and lower sections, a head connected to the torso and upper and lower arm sections and upper and lower leg sections pivotally secured to the torso and which may be rotated to an adjusted, fixed position; and a section of a human skeleton portion in each section and provided with a duct for the introduction of a measuring instrument, and a tissue-equivalent solution in each shell.

References Cited in the file of this patent

UNITED STATES PATENTS

| | | |
|---|---|---|
| 983,547 | Fleck | Feb. 7, 1911 |
| 2,034,446 | Saxe | Mar. 17, 1936 |
| 2,288,296 | Munro | June 30, 1942 |
| 2,551,560 | Graves | May 1, 1951 |
| 2,611,998 | Senior et al. | Sept. 30, 1952 |

OTHER REFERENCES

"Juno": Pamphlet of the Cleveland Health Museum, copyright 1952 (21 pages including covers) (Copy in 35–17.1.)